May 28, 1963 — C. H. NORDELL — 3,091,338
ALTERNATING COMMINUTOR
Filed Nov. 9, 1959 — 3 Sheets-Sheet 1
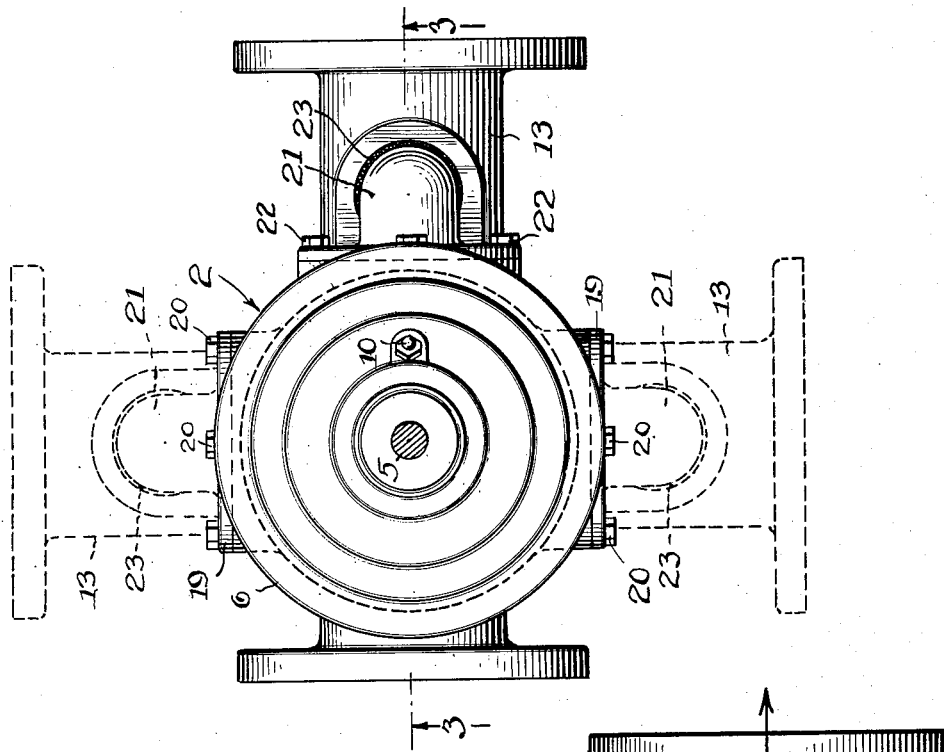
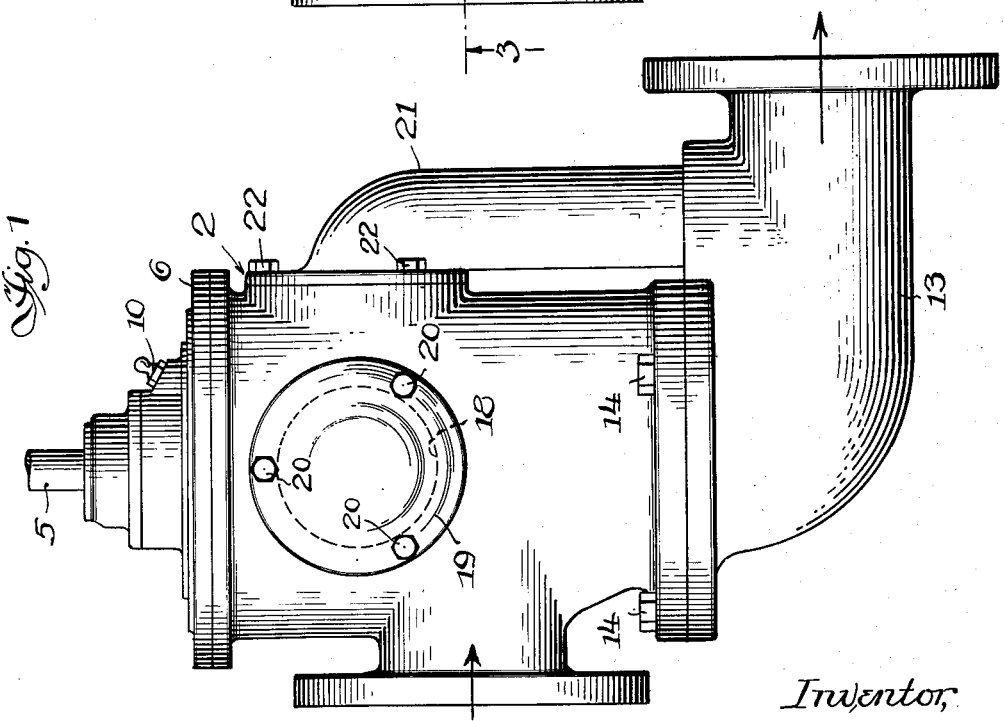
Inventor,
Carl H. Nordell,
By: Schneider, Dressler, Goldsmith & Clement, Attys.

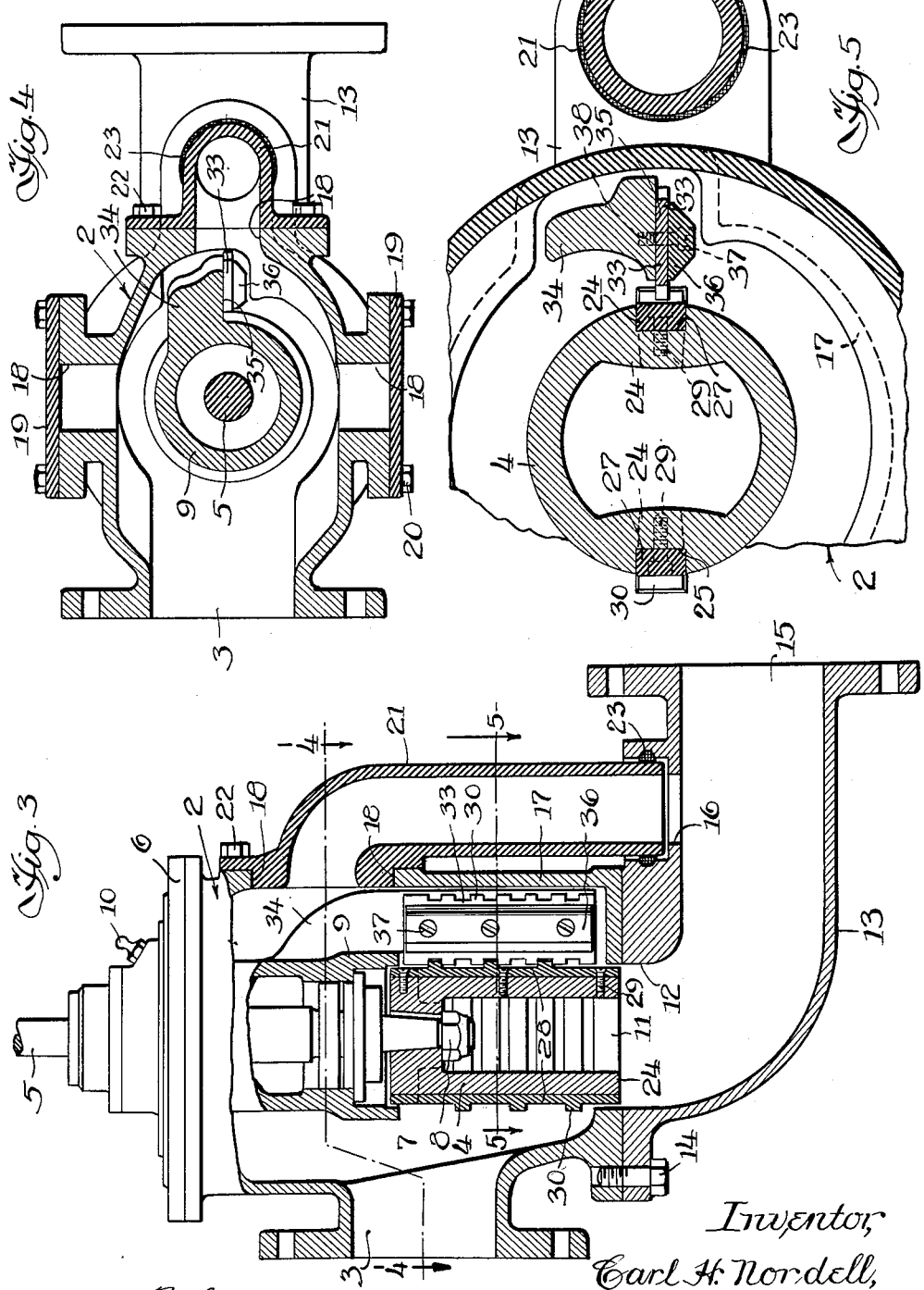

May 28, 1963 C. H. NORDELL 3,091,338
ALTERNATING COMMINUTOR
Filed Nov. 9, 1959 3 Sheets-Sheet 3
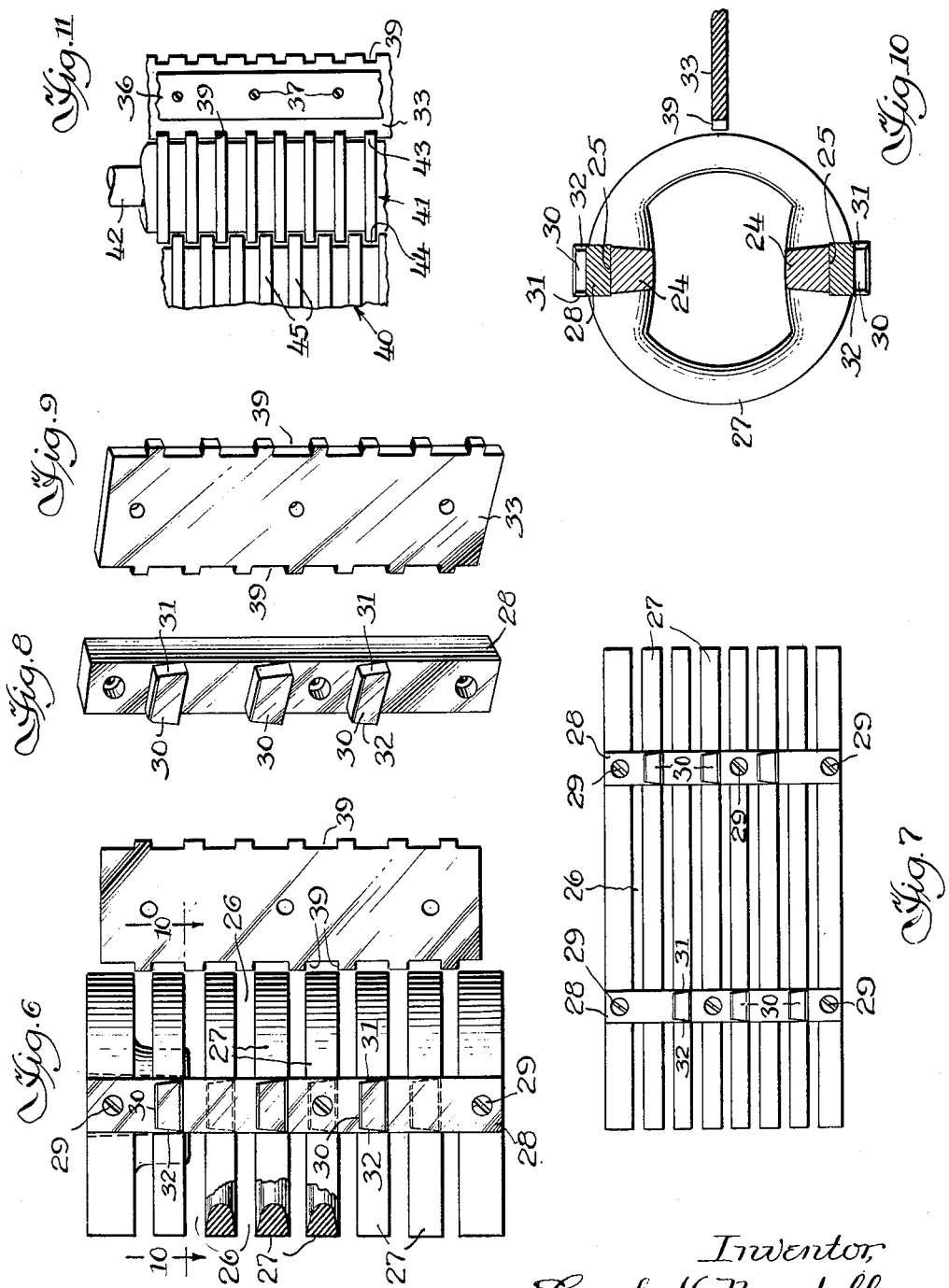
Inventor,
Carl H. Nordell,
By: Schneider, Dressler, Goldsmith & Clement, Attys.

United States Patent Office 3,091,338
Patented May 28, 1963

3,091,338
ALTERNATING COMMINUTOR
Carl H. Nordell, Crystal Bay, Nev., assignor of fifteen percent each to Louise N. Millspaugh and Anne N. Kaspar, both of Palm Springs, Calif.
Filed Nov. 9, 1959, Ser. No. 851,823
2 Claims. (Cl. 210—174)

This invention relates to a comminuting device of the type having a rotatable cutting member coacting with a stationary comb to comminute solids intercepted in a flowing sewage stream.

The cutting member comprises a rotating cylinder having a plurality of cutting teeth projecting laterally from its peripheral surface or from shear bars mounted on the periphery of the cylinder. The shear bars extend longitudinally of the cylinder and project slightly beyond the peripheral surface of the cylinder. The cutting teeth project beyond the outer surface of the shear bars. The rotating cylinder may comprise the screen for intercepting the solids, or may be a separate cylinder mounted adjacent the screen with its projecting cutters adapted to remove the intercepted solids from the surface of the screen upon which such solids are intercepted.

The solids intercepted by the rotating screen are comminuted by cooperation of the laterally projecting cutting teeth and a vertically disposed comb. The comb is provided with notches in one edge laterally aligned with said cutting teeth and is positioned sufficiently close to the teeth to coact therewith. Preferably the comb has notches in both longitudinal edges so that it may be reversed when the first notched edge becomes worn. The teeth carry the solids around to the comb, and attempt to push such solids through the notches of the comb. The solids are usually too large to be pushed through said notches, and are comminuted by the cutting action between the sides of the teeth and the sides of the notches adjacent the sides of the teeth as the teeth pass into and through said notches.

The cutting action may be compared to a punch and die operation. Normally the solid matter that is aligned with the end of a tooth is cut from the rest of the solid matter by the coaction of the tooth and the notch aligned with said tooth. The cut or comminuted portion of said solid matter is pushed through said notch as the tooth passes therethrough. Some of the solid matter spread beyond the sides of the tooth falls back into the sewage stream, and the rest of said solid matter is deposited as a residue on the side of the comb against which it is propelled by the tooth.

This solid residue is a crumpled heterogeneous matted mass that keeps extending itself over the side of the comb. Successive teeth carry additional solids to the comb, and this mass is compacted by the cutting cylinder and the shear bars that rotate in close proximity to the comb. In sewage this mass of solids is usually composed of tightly twisted and compressed masses of rags. The shear bars also tear or shred some of the solid matter as they pass in close proximity to the edge of the comb between the notches.

The mat of solid matter must eventually be represented to the cutting zone for comminution. This has heretofore been accomplished by directing the incoming flow of water along and past the comminuting zone. The flow of water causes the mat to curve away from the side of the comb and turn back into the path of the cutting teeth. The length of time it takes for this residual solid matter to move into the cutting zone depends upon the flow of incoming sewage. If the sewage flow is heavy enough, the teeth bring solid matter to the comminuting zone faster than it can be comminuted, and the accumulation of such solid matter on the side of the comb increases.

Such accumulation of solid matter is compacted by the pressure of the additional solid matter and by the pressing action of the screen and shear bars which pass in close proximity to the edge of the comb as the screen is rotated. When the rate of deposition of solid matter decreases, the solid matter is gradually washed away from the comb and is carried back into the path of the cutting teeth by the flow of water.

The compactness of such masses of solid matter makes it resistant to comminution. Consequently, it has heretofore been considered necessary to make the comb massive, so that it would be heavy enough to withstand the severe stresses caused by the comminution of the compacted solids. The thickness of the comb made it necessary to provide a wide support for the comb. The support blocked a portion of the screening area, and so reduced the flow capacity of the screen.

The surfaces of the notches rearwardly of the face of the comb against which the solids were comminuted have been cut away, or relieved, so that solids that were comminuted could readily pass through the notches. The length of the passage between the sides of the notches and the sides of the teeth was so long that if such surfaces were not cut away, the solid matter would jam the passage. The jamming of solid matter in the notches tends to block the notches, thereby resisting the passage of the cutting teeth through the notches and causing excessive wear on the cutting parts.

In accordance with the present invention, the solid matter deposited on either side of the comb is rapidly removed from the comb before it can be compacted to a hard mass. The solid matter removed from the comminuting zone contiguous to one side of the comb is represented for comminution in a different comminuting zone contiguous to the other side of the comb. The comminution alternately in two separate comminuting zones contiguous to opposite surfaces of a single stationary comb is accomplished by reversing the direction of rotation of the support member on which the cutting teeth are mounted, and by reducing the thickness of the comb.

Mere reversal of the direction of rotation of the cutting member is not sufficient to attain the desired result because the size and shape of the comb previously used made it incapable of cooperating with the cutting teeth to comminute the solids in both directions. The cut away portion of the comb adjacent the notches rearwardly of one side of the comb made the cut away side of the comb unsatisfactory for comminuting cooperation with the cutting teeth. Devices of this type required two combs, one for each direction of travel of the cutting member, as shown in my prior Patent No. 2,672,985 issued March 23, 1954. The double comb structure, with mechanism for shifting from one comb to the other, is both bulky and expensive.

In the present structure the thickness of the comb is reduced to shorten the length of the passage between the sides of the teeth and the sides of the notch so that solid matter comminuted by the coaction of the cutting teeth and notches cannot jam the passage. The comminuted solid matter is pushed all the way through the notch by the coacting tooth and falls into the screened sewage. The surface of the notches rearwardly of the cooperating side of the comb do not have to be cut away in order to allow the comminuted solid matter to pass through the notches of the comb into the screened sewage. Making the notches of the comb of uniform cross sectional area throughout their depth permits either side of the comb to coact with the cutting teeth to comminute the solid matter. Therefore, the use of a thin comb having notches of uniform cross section throughout their depth permits use of a single comb with a reversible cutting member. The fact that the screen is rotated through a complete circle makes substantially the entire peripheral surface of the screen effective as a screening area. As shown in FIGS. 5 and 10, only a very small portion of the screen is blocked by the comb and its support.

The cutting member is reversed at relatively short intervals of time, in the order of a minute or less, to prevent any excessive build-up of solid matter on either side of the comb. Any solid matter deposited on either side of the comb is moved therefrom before it has a chance to be compacted when the cutting member is reversed.

If a mat of solid matter starts to form on one side of the comb, the movement of the teeth through the notches of the comb in the opposite direction kicks the solid matter off the comb. The removal of solid matter from the comb is assisted by the churning of the liquid caused by the reversed rotation of the cylinder from which the cutting teeth project. Some of the solid matter is moved directly into the unscreened sewage stream, and some of it is carried by the cutting cylinder around to the opposite side of the comb for comminution in a second comminuting zone that is substantially contiguous to the first comminuting zone, being spaced therefrom only by the thickness of the comb.

The solid matter that is removed from the comb is not immediately re-presented to the comb for comminution, but is immersed in the turbulent flow of sewage around the cutting cylinder and is quickly disintegrated into its original soft condition. This is true of the solid matter that is carried by the teeth around to the opposite side of the comb, as well as the solid matter that drops into the unscreened sewage, because all of said solid matter is carried through the liquid sewage and is tumbled by the turbulence of the liquid through which the cutting member rotates. When the uncomminuted solid matter deposited on one side of the comb is re-presented to the comb for comminution it is in substantially the same condition in which it was originally deposited on the comb.

Some of the solids presented to the comb for comminution are hard enough to subject the comb and the cutting teeth to considerable stress when such solids are comminuted. The reversal of the cutting member does not eliminate such stresses, which the comb and cutting teeth must withstand. The reversal of the cutting member does reduce the total stresses to which the comb and cutting teeth are subjected, by preventing solids that are originally soft from becoming compacted. Any reduction in the total stresses to which the comb and cutting teeth are subjected reduces the wear on these parts.

In applicant's structure the comb is clamped between flat surfaces of two members that engage most of the surface area of the flat sides of the comb and terminate adjacent the rear edges of the notches of the comb. The members between which the comb is clamped provide substantial reinforcement for the comb. The useful life of the comb is lengthened by the reinforcement, and by reversal of the cutting cylinder at short intervals of time so that the originally soft solids do not get a chance to get compacted into a hard mass. The use of both sides of the comb also lengthens the useful life of the comb because it doubles the total cutting capacity of the comb.

The structure by means of which the above-mentioned and other advantages of the invention are attained will be fully described in the following specification, taken in conjunction with the accompanying drawings showing two preferred illustrative embodiments of the invention, in which:

FIG. 1 is a front elevational view of a comminuting device embodying the invention;

FIG. 2 is a top elevational view of the structure shown in FIG. 1;

FIG. 3 is a cross sectional view, taken along line 3—3 of FIG. 2, with the top portion of the structure shown in elevation;

FIG. 4 is a cross sectional view, taken along the line 4—4 of FIG. 3;

FIG. 5 is a fragmentary cross sectional view, taken along the line 5—5 of FIG. 3;

FIG. 6 is a side elevational view of the rotatable screen and the comb, with portions of the screen broken away;

FIG. 7 is a development of the screen, showing both shear bars and cutting teeth;

FIG. 8 is a detail perspective view of a shear bar with cutting teeth secured thereto;

FIG. 9 is a detail perspective view of the comb;

FIG. 10 is a cross sectional view, taken along the line 10—10 of FIG. 6; and

FIG. 11 is a fragmentary side elevational view of a modified embodiment of the invention.

Referring to the drawings, a housing 2 is provided with an inlet opening 3 into which unscreened sewage flows. A screen 4 is rotatably mounted in the housing by means of a shaft 5 depending from a reversible motor (not shown). Shaft 5 extends through the top 6 of housing 2 and top wall 7 of screen 4. A nut 8 threaded on the lower end of shaft 5 holds screen 4 in place with its upper edge within a sleeve 9 that is secured to top 6 and depends therefrom to enclose shaft 5. A slight clearance is provided between the outer surface of screen 4 and the inner surface of sleeve 9 to permit rotation of the screen with shaft 5. An oil cup 10 provides convenient lubrication for shaft 5.

Screen 4 is cylindrical and has an open end 11 opposite its top wall 7. The open end of screen 4 is positioned over an opening 12 in a conduit 13 secured to the bottom of housing 2 by means of bolts 14. The opposite end 15 of conduit 13 leads to an effluent channel (not shown) through which the screened sewage flows. Conduit 13 is provided with an opening 16 (FIG. 3) spaced outwardly of the side wall 17 of housing 2.

Three sides of housing 2 are each provided with an opening 18. These openings are duplicates of each other. One of said three openings is diametrically opposite inlet 3, and the other two openings are spaced 90° on opposite sides of said one opening. The openings may of course be located in any desired spaced relationship. Two of these openings are closed by removable plates 19 secured to the housing by bolts 20. One end of a by-pass conduit 21 fits against housing 2 in alignment with the one opening 18 that is not closed, and is secured to housing 2 by bolts 22. The other end of by-pass conduit 21 fits into opening 16. An O-ring 23 is positioned between the outer surface of the lower end of by-pass conduit 21 and the surface of housing 2 defining opening 16, to seal the joint between said surfaces. Bolts 14 and 22 may be removed to move conduit 13 and by-pass conduit 21 as a unit, whereby the by-pass conduit may be connected to any one of the three openings 18 to direct the flow of screened sewage through conduit 13 in any one of three directions.

At diametrically opposite points screen 4 is provided with integral interior projections 24 to form thickened wall portions extending the entire length of the screen. The preferred structure has two projections, as shown in FIGS. 5 and 10, but three or four projections may be provided, if desired. The projections are preferably spaced equally about the circumference of the screen, regardless of the number of such projections. The thickened wall portions are each provided with a longitudinal recess 25 extending inwardly from the peripheral surface of the screen. Recesses 25 are of uniform depth and are identical.

The cylindrical wall of screen 4 is slotted transversely between projections 24 to form passageways 26 and annular rings 27. Slots 26 permit liquid sewage and solids small enough to pass through said slots to flow from inlet 3 into conduit 13. The slots on each side of screen 4 are aligned laterally with the slots on the opposite side.

A shear bar 28 fitting into each recess 25 is rigidly secured to screen 4 by screws 29. The outer surface of each shear bar extends laterally a slight distance beyond the peripheral surface of screen 4, as shown in FIGS. 5 and 10, for a purpose hereinafter disclosed. Each shear bar serves as a support member for a plurality of individual cutting teeth 30 that are rigidly secured thereto with the outer edges of said teeth projecting laterally a uniform distance beyond the outer surface of the shear bars. As shown, each shear bar has three cutting teeth aligned laterally with alternate rings 27. The cutting teeth on one shear bar are staggered relative to the cutting teeth on the other shear bar. The number of teeth may be varied, and, if desired, each shear bar may have a cutting tooth 30 aligned laterally with each ring 27.

Although the cutting teeth are illustrated as being rigidly secured to the shear bar in any suitable manner, they may be mounted on any other suitable support member, independently of the shear bars. For example, the cutting teeth may be mounted on rings 27, or may be mounted on bars secured to screen 4 in the same manner as the shear bars are mounted. Regardless of the specific support member used, or the manner in which the cutting teeth are mounted, it is essential that they be rigid with respect to screen 4, so that they cannot be accidentally displaced relative to the screen.

As shown in FIGS. 6–8, each cutting tooth is tapered slightly at each end, as indicated at 31 and 32, respectively, to cooperate with a comb 33. The taper at each end of each tooth is shown as extending inwardly from the bottom of the tooth. It is not essential that each taper be in the same direction, but it is desirable that each tooth have a taper at each end for a reason hereinafter disclosed.

Sleeve 9 is provided with an integral projection 34 extending outwardly and downwardly. The depending portion of projection 34 is provided with a flat surface 35 disposed in a vertical plane extending radially of the screen. Comb 33 is positioned against flat surface 35 and held against said surface by a clamping member 36. Screws 37 extend through clamping member 36 and comb 33, and are screwed into threaded recesses 38 (FIG. 5) in projection 34 to clamp the comb tightly between clamping member 36 and flat surface 35.

Comb 33 is provided with a series of notches 39 on each of its opposite longitudinal edges. In FIG. 7 the cutting teeth on each shear bar 28 are shown as being aligned with alternate notches 39, but it will be understood that each shear bar may have a cutting tooth aligned laterally with each notch 39, if desired. Only one edge of the comb is used at one time, but it is preferred to provide notches on both edges so that the comb may be reversed to use the second edge when the notches at one edge become worn. When the screen is rotated in either direction, teeth 30 pass through notches 39 to comminute solid matter caught between the notches and teeth. The comminuting action is not efficient when the gap between any notch and the teeth adapted to pass through said notch is too large.

The notches are aligned laterally with the cutting teeth and are dimensioned to provide a very small clearance gap between the sides of the teeth and the adjacent sides of the notches. The depth of each notch is large enough to provide a small clearance gap between the bottom of the notch and the outer edge of the cutting tooth that passes through the notch as the screen is rotated. The sides of notches 39 are perpendicular to the bottom of the notch so that the cross sectional area of each notch is uniform throughout its depth.

The perpendicular relationship between the sides of the notches and the bottom is necessary to enable the notches to be able to cooperate with either end of the cutting teeth. Any solid matter extending across the notches is engaged by one end of a cutting tooth as said tooth enters the notch. The portion of said solid matter aligned with the entering end of the cutting tooth is cut out of the solid matter and pushed by said tooth through said notch.

As the rotation of screen 4 in either direction moves one edge of a shear bar 28 into alignment with comb 33, the adjacent ends of all the teeth on the shear bar simultaneously engage the solid matter between said teeth and the notches aligned therewith. If the entire surface area of one end of each tooth engaged the solid matter simultaneously, the teeth and the comb would be subjected to considerable stress. Tapers 31 and 32 at opposite ends of the teeth cause the ends of the teeth to enter into the comminuting relationship with the comb progressvely, and thereby minimize the stress to which each tooth and the comb are subjected.

If the comb is relatively thick, the comminuting action will not be efficient. The length of the path of travel of the comminuted solids between the sides of the tooth and the sides of the notch through which the tooth passes is equal to the thickness of the comb, and if this path of travel is too long such solids may become jammed in the notches of the comb. Solid matter jammed in the notches of the comb resists the passage of the cutting teeth through the notches and causes excessive wear on the teeth and the comb. This difficulty has been avoided in the past by cutting away the surfaces of the comb defining the notches rearwardly of the side of the comb toward which the teeth are moved, so that the comminuted solids could be easily pushed through the notches of the comb by the teeth as they passed through said notches. This cutting away of the back side of the comb makes a relatively wide gap between the sides of the teeth and the sides of the notches at the back side of the comb and therefore it is impossible for the comb to cooperate with the teeth when the teeth are rotated toward the back side of the comb. With the cut away structure at the back of the comb, the solid matter can be comminuted only when the teeth are rotated toward the front side of the comb.

In the present structure the comb is made thinner to shorten the length of the passage between the sides of the teeth carried by the shear bar and the sides of the notches in the comb to such an extent that it is not necessary to cut away the surfaces of the comb on the back side of the comb contiguous to the notches. Thus, as best seen in FIG. 9, in the preferred embodiment of the invention each land area between notches in the comb is approximately as thick as it is wide, so that the cross-section of each such land area is approximately a square. Each tooth pushes the solid matter cut by it through the notch without difficulty as it passes through the notch. Accordingly, the teeth are adapted to cooperate with the comb to comminute solid matter interengaged between the teeth and the comb regardless of the direction of rotation of the teeth.

The operation of the comminuting device may be summarized as follows. Sewage, comprisng a mixture of liquid and solid matter, flows through inlet opening 3 to screen 4. The liquid, together with solids that are small enough, passes through slots 26 to the interior of the cylindrical screen and through its open bottom 11 into conduit 13. Normally the sewage level is below the top of screen 4, but if it does rise above the top of the screen some of the liquid flows over the top of the screen through by-pass conduit 21 and directly into conduit 13.

Rotation of the screen in either direction carries the solid matter to one side of the comb. The interengagement of the teeth and the notches of the comb with said solid matter causes the teeth to comminute portions of said solid matter. The comb is so thin that the teeth push the comminuted portions of the solid matter through aligned notches of the comb as said teeth pass through the notches. The comminuted portions of the solid matter are small enough to pass through slots 26 and are carried through said slots by the incoming sewage flow.

Portions of the solid matter adjacent the teeth are deposited on the adjacent side of the comb.

The residual deposit of solid matter on the side of the comb toward which the screen rotates continues to grow as long as the screen is rotated in the same direction. The shear bars pass very close to the edge of the comb between the notches as the screen is rotated. The shear bars shear some of the solid matter, but tend to compact the rest of the solid matter deposited on the side of the comb. The screen, which also passes close to the comb in its rotational path, also tends to compact said solid matter.

Before this residue of solid matter is firmly compacted the rotation of the screen is reversed. Immediately upon reversal of the direction of rotation of the screen, the teeth kick said solid matter away from the first side of the comb. The teeth carry a substantial portion of the solid matter, together with additional solid matter intercepted by the screen, to a second comminuting zone substantially contiguous to the first comminuting zone, but on the other side of the comb. The process is then repeated, with the direction of rotation of the screen being reversed approximately once a minute. It is important to reverse the rotation of the screen at short intervals to prevent compacting the residual solid matter on either side of the comb into a hard mass that would resist comminution.

In the embodiment shown in FIG. 11, comb 33 is the same as in the embodiment of FIGS. 1–10, and it is mounted in the same manner. A cylindrical screen 40 is rotatably mounted with its peripheral surface spaced from the edge of comb 33. A cutting cylinder 41 is mounted on a shaft 42 adapted to rotate it in either direction. Cylinder 41 serves as a support member for laterally projecting cutting teeth 43 that are aligned laterally with notches 39 and with spaces 44 between screen bars 45. The comb and screen are spaced apart a distance approximately equal to the diameter of the cutting cylinder 41. As the screen and cutting cylinder rotate, the cutting teeth remove intercepted solids from the screen and carry them to one side of the comb for comminution. As in the embodiment of FIGS. 1–10, the direction of rotation of the cutting cylinder is reversed at short intervals to prevent compacting of solid matter deposited on either side of the comb.

Although I have described two embodiments of the invention in considerable detail, it will be understood that the description is intended to be illustrative, rather than restrictive, as many details of structure may be modified or changed without departing from the spirit or scope of the invention. Accordingly, I do not desire to be restricted to the exact structure disclosed.

I claim:
1. A vertical comminuting device for comminuting sewage solids in a sewage stream comprising a housing having an inlet and an outlet, a hollow cylindrical screen having a vertical longitudinal axis and vertically spaced horizontal slots leading to the interior of said screen, said screen being rotatably mounted in said housing and substantially filling the cross section of the outlet of said housing, a motor for rotating said cylindrical screen in opposite directions, means for reversing the direction of rotation of said cylindrical screen alternately through at least one complete revolution in opposite directions, a single flat comb fixedly and vertically mounted in said housing having a forward surface adjacent said cylindrical screen and having a rearward surface, said comb lying along a plane in which the longitudinal axis of said cylindrical screen lies, which plane also intersects the rearward and forward surfaces of said comb, said comb having notches of uniform cross section in the forward surface throughout its depth, said notches having oppositely disposed cutting edges, a plurality of cutting teeth connected to said screen and aligned with said notches in said comb, said teeth having two oppositely disposed cutting edges, the edges of said notches and the edges of said teeth cooperating to comminute sewage solids when said screen is rotated in either direction, whereby as the cylindrical screen rotates in either direction sewage solids are comminuted and reduced to a size small enough to pass through the slots in said cylindrical screen into the interior of said screen, thence out the outlet of said housing.

2. The device of claim 1 wherein shear bars are mounted on said cylindrical screen and parallel to said longitudinal axis and said teeth are mounted on said shear bars, said shear bars extending radially beyond the periphery of said cylindrical screen, said shear bars being disposed so that they cooperate with the forward surface of said comb as said cylindrical screen revolves in either direction to shear sewage solids and clear the forward surface of said comb.

References Cited in the file of this patent

UNITED STATES PATENTS

| | | |
|---|---|---|
| 2,305,935 | Thom | Dec. 22, 1942 |
| 2,336,069 | Chase | Dec. 7, 1943 |
| 2,523,004 | Fowler | Sept. 19, 1950 |
| 2,708,036 | Lauwasser | May 10, 1955 |
| 2,803,410 | Bodoni | Aug. 10, 1957 |
| 2,921,683 | Strenz et al. | Jan. 19, 1960 |